US010108179B2

(12) United States Patent
Fukatsu

(10) Patent No.: US 10,108,179 B2
(45) Date of Patent: Oct. 23, 2018

(54) NUMERICAL CONTROL DEVICE, INFORMATION COORDINATION SYSTEM, AND INFORMATION COORDINATION PROGRAM

(71) Applicant: Mitsubishi Electric Corporation, Tokyo (JP)

(72) Inventor: Noriyasu Fukatsu, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 360 days.

(21) Appl. No.: 14/766,890

(22) PCT Filed: Apr. 10, 2013

(86) PCT No.: PCT/JP2013/060850
§ 371 (c)(1),
(2) Date: Aug. 10, 2015

(87) PCT Pub. No.: WO2014/167677
PCT Pub. Date: Oct. 16, 2014

(65) Prior Publication Data
US 2015/0370243 A1 Dec. 24, 2015

(51) Int. Cl.
G05B 19/414 (2006.01)
(52) U.S. Cl.
CPC .. *G05B 19/414* (2013.01); *G05B 2219/33099* (2013.01)
(58) Field of Classification Search
CPC .................. G05B 19/414; G05B 2219/33099
See application file for complete search history.

(56) References Cited

U.S. PATENT DOCUMENTS 4,926,105 A 5/1990 Mischenko et al.
6,490,498 B1 12/2002 Takagi
(Continued)

FOREIGN PATENT DOCUMENTS

JP 63-245289 A 10/1988
JP 06-110521 A 4/1994
(Continued)

OTHER PUBLICATIONS

Japanese Office Action issued in JP 2013-541538 dated Dec. 10, 2013.
(Continued)

*Primary Examiner* — Emilio J Saavedra
(74) *Attorney, Agent, or Firm* — Sughrue Mion, PLLC; Richard C. Turner

(57) ABSTRACT

Included are a machining device having a drive unit, a data memory, and an instruction unit; and a database server that stores NC data used by the machining device as a database, each connected via a network. The machining device is used in an information coordination system in which information in the NC data is coordinated between the machining device and the database server. The machining device includes an NC-data collection unit that collects the NC data from the data memory; an information-coordination-command generation unit that generates an information coordination command to access the database in the database server so as to match data corresponding to the machining device in the database server with the collected NC data; and an information-coordination-command transmission unit that transmits the information coordination command to the database server.

11 Claims, 13 Drawing Sheets

(56) References Cited

U.S. PATENT DOCUMENTS

| | | | |
|---|---|---|---|
| 7,133,803 B2 | 11/2006 | Kappel | |
| 8,862,251 B2 | 10/2014 | Oiwa et al. | |
| 2003/0014498 A1* | 1/2003 | Kreidler | G05B 19/0426 709/217 |
| 2012/0303674 A1* | 11/2012 | Boensch | G06F 17/3056 707/802 |

FOREIGN PATENT DOCUMENTS

| | | |
|---|---|---|
| JP | 2001-219341 A | 8/2001 |
| JP | 2002-023812 A | 1/2002 |
| JP | 2003-071645 A | 3/2003 |
| JP | 2004-199670 A | 7/2004 |
| JP | 3580347 B2 | 10/2004 |
| JP | 2005-202831 A | 7/2005 |
| JP | 2005-284804 A | 10/2005 |
| JP | 2006-243936 A | 9/2006 |
| JP | 2007-249313 A | 9/2007 |
| JP | 2008-269501 A | 11/2008 |
| JP | 2009-175793 A | 8/2009 |
| JP | 4593142 B2 | 12/2010 |
| JP | 2012-079290 A | 4/2012 |
| JP | 2012-108642 A | 6/2012 |

OTHER PUBLICATIONS

International Search Report of PCT/JP2013/060850 dated Jul. 2, 2013.

* cited by examiner

| INFORMATION-COORDINATION SETTING ID | IN-DB TABLE NAME | IN-NC DATA SOURCE NAME | IN-RECORD COLUMN NAME |
|---|---|---|---|
| SERIAL NUMBER | INSERTION | OPERATION HISTORY - OPERATOR | OPERATOR |
| | | ACTIVATION HISTORY - WORKING TIME | ACTIVATION TIME |
| | | ACTIVATION HISTORY - WORKPIECE CURRENT POSITION | WORKPIECE CURRENT POSITION |

FIG.11

| INFORMATION-COORDINATION SETTING ID | IN-DB TABLE NAME | IN-NC DATA SOURCE NAME | IN-RECORD COLUMN NAME |
|---|---|---|---|
| SERIAL NUMBER | EXTRACTION | WORKPIECE | WORKPIECE TYPE |
| | | WORKPIECE PARAMETER | MACHINING METHOD |
| | | MACHINING PRIORITY | MACHINING ORDER |

86

FIG.13
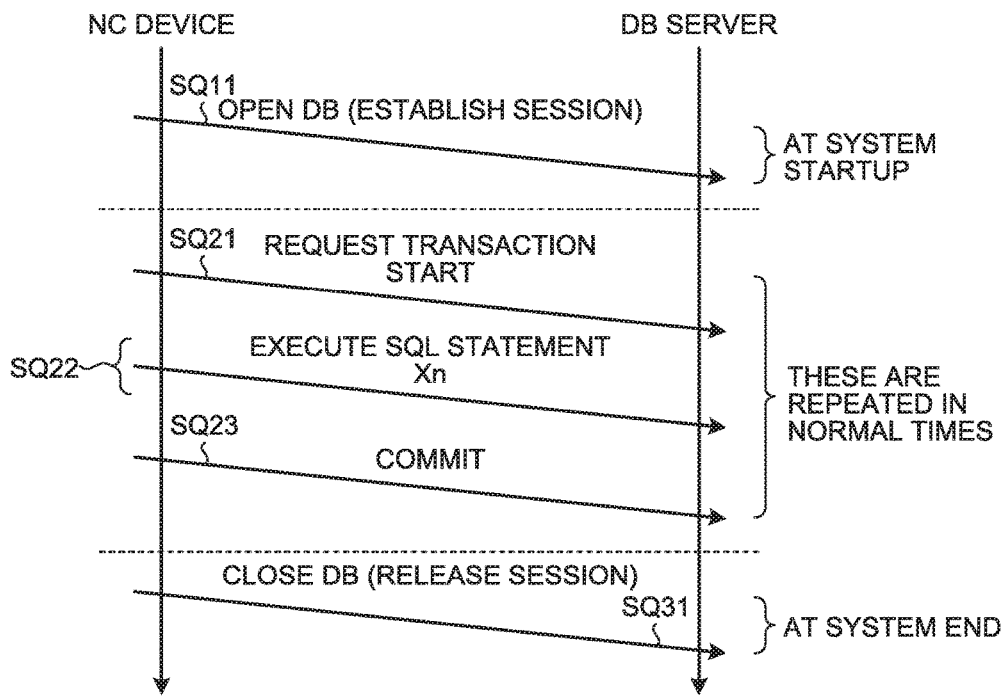
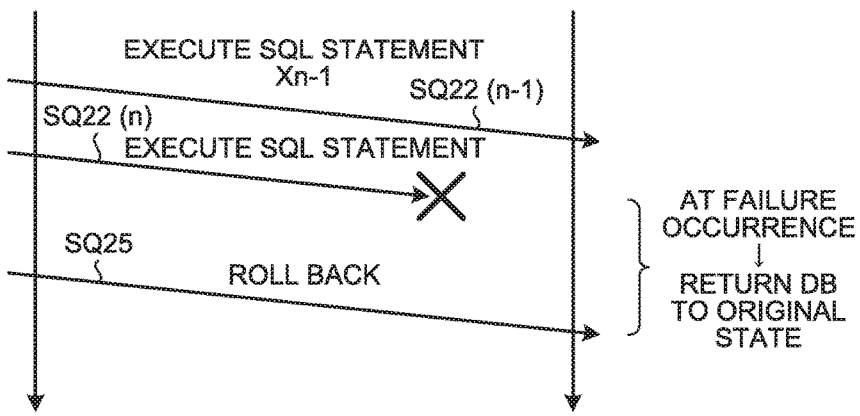

NUMERICAL CONTROL DEVICE, INFORMATION COORDINATION SYSTEM, AND INFORMATION COORDINATION PROGRAM

CROSS REFERENCE TO RELATED APPLICATIONS

This is a National Stage of International Application No. PCT/JP2013/060850 filed Apr. 10, 2013, the contents of which are incorporated herein by reference in its entirety.

FIELD

The present invention relates to a numerical control device, an information coordination system, and an information coordination program.

BACKGROUND

A numerical control (hereinafter, NC) device generally includes an NC control unit, an instruction unit primarily constituted by an NC operation panel, and a drive unit constituted by a servo amplifier, a main shaft amplifier, a motor, or a detector. Computerized NC (CNC) devices that have high-performance dedicated microcomputers incorporated therein and that can perform complicated and advanced control with high reliability are also currently used as NC devices.

The NC device can also execute sequence control according to an input signal from a sensor, a switch, or the like installed in a machine tool. Operations that are controlled are operations associated with the machine tool such as tool replacement and swarf removal. A program describing a series of machining operations for the NC device to perform is referred to as "NC programming". This program has the tool routing, the machining conditions, or the like required for machining and is represented in the form of command for the NC device to follow. The NC program can be downloaded from an external program automatic-generation device to the NC device or it can be directly input through the NC operation panel.

Generally, the NC device is used in fields requiring higher-speed and higher-accuracy control, and such qualities cannot be implemented by a system established by combining a general-purpose sequencer and a general-purpose servo. This type of NC device can execute control having high real-time performance that provides a fast response equal to or lower than 0.5 milliseconds in a servo system and being highly accurate so as to provide control at the 0.1-μm level. The NC device also has stable characteristics that enable high-level servo acceleration/deceleration control that does not cause vibration while executing control having a high real-time performance and that is highly accurate. The NC device can also execute correction control on the machine due to backlash, torsion, flexure, stretch, and shrinkage occurring in accordance with the stiffness factor of the machine. Furthermore, the NC device can also execute synchronous control such that one workpiece is machined simultaneously using a plurality of gears, such as moving to another machining area without stopping the rotation of a workpiece that is being rotated.

In recent years, to rapidly address any change in the status of production or the like in a factory, it is important to promptly refer to or evaluate changes in information related to production taking place in various production facilities. Therefore, the machine tool is also required to accurately and promptly refer to or evaluate machining information in order to rapidly respond to a change in the machining status. For this purpose, an NC device having a machining-information communication function has been proposed (see, for example, Patent Literature 1).

Patent Literature 1 discloses a system with a structure in which an FA (Factory Automation) network having programmable controllers, a data file having data obtained from the programmable controllers stored therein, and a user application are connected via a data management device. The data management device functions as middleware between the programmable controllers and the data file or the user application in order to perform a process of storing data collected from the PLCs in the data file or notifying the user application thereof.

CITATION LIST

Patent Literature

Patent Literature 1: Japanese Patent No. 3580347

SUMMARY

Technical Problem

The technique, described in Patent Literature 1 listed above, has a problem due to it requiring a database that has stored therein data concerning a machine tool or a control device on the FA network side, the data management device serving as a dedicated information processing terminal for storing the data concerning the machine tool or the control device in the database, and middleware that enables the data management device to perform an exchange of data between the programmable controllers and the database. Accordingly, the installation area of the system is increased, the cost of maintenance for the dedicated information processing terminal is additionally required, and administration costs of the system are high.

The present invention has been achieved in view of the above problems, and an objective of the present invention is to provide a numerical control device, an information coordination system, and an information coordination program that can reduce the maintenance cost without requiring a dedicated information processing terminal and middleware enabling data concerning a machining device to be stored in a database.

Solution to Problem

In order to achieve the objective, the present invention relates to a numerical control device that includes a machining unit that machines a workpiece, a data memory that stores therein numerical control data used during machining of the workpiece, and a controller that performs calculating using data in the data memory and controls the machining unit, the numerical control device being used in an information coordination system in which the numerical control device and a numerical-control-data storage device, which has data including numerical control data that is used by the numerical control device stored therein as a database, are connected via a network to provide information coordination of the numerical control data between the numerical control device and the numerical-control-data storage device. The numerical control device includes: a numerical-control-data collection unit that collects the numerical control data from the data memory; an information-coordination-command generation unit that generates an information coordination command to access the database in the numerical-control-data storage device so as to match data that corresponds to the numerical control device and is stored in the numerical-control-data storage device with the collected numerical control data; and an information-coordination-command transmission unit that transmits the information coordination command to the numerical-control-data storage device.

Advantageous Effects of Invention

According to the present invention, numerical control data in the data memory of a numerical control device is collected, and an information coordination command to update the data in a numerical-control-data storage device with the collected numerical control data is generated and transmitted. Therefore, the numerical control data of the numerical control device can be stored in the numerical-control storage device without preparing a dedicated information processing terminal that has dedicated middleware and that is external to the numerical control device. As a result, the installation area of the entire system can be downsized and maintenance costs can be reduced.

FIG. B is a diagram illustrating an example of a data structure of an information-coordination timing setting.

Figures 9, 10:
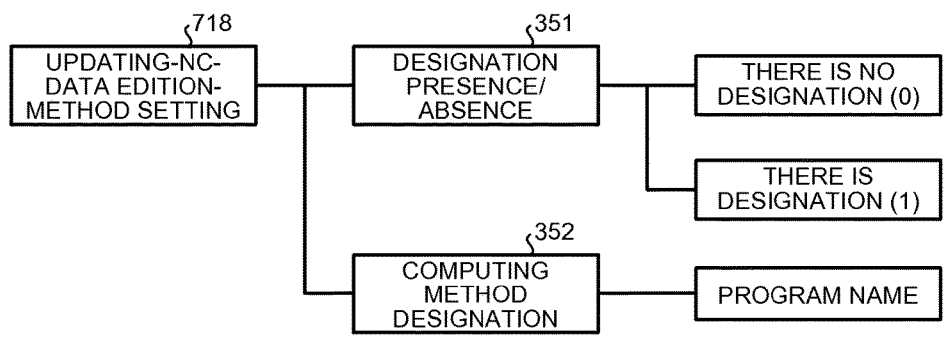

FIG. 9 is a diagram illustrating an example of a data structure of an updating-NC-data edition-method setting.

FIG. 10 is a diagram illustrating an example of the data structure of collection NC data.

FIG. 11 is a diagram illustrating an example of the data structure of updating NC data.

Figure 12:
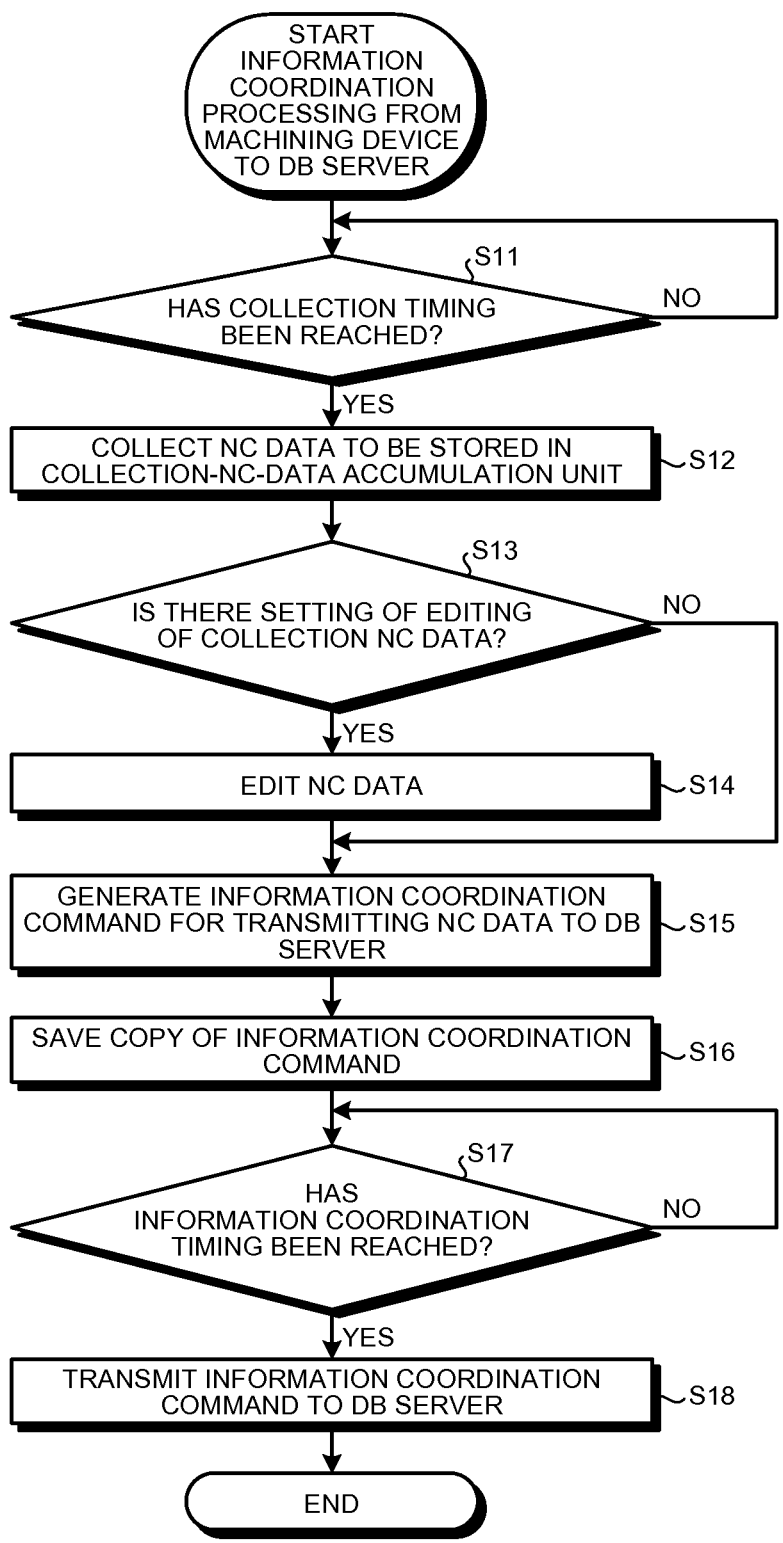

FIG. 12 is a flowchart illustrating an example of the procedure performed in an information coordination task while processing the coordination of information from a machining device with a database server in the information coordination system.

FIG. 13 are sequence diagrams illustrating an example of a procedure for coordinating information between an NC device and a database server.

Figure 14:
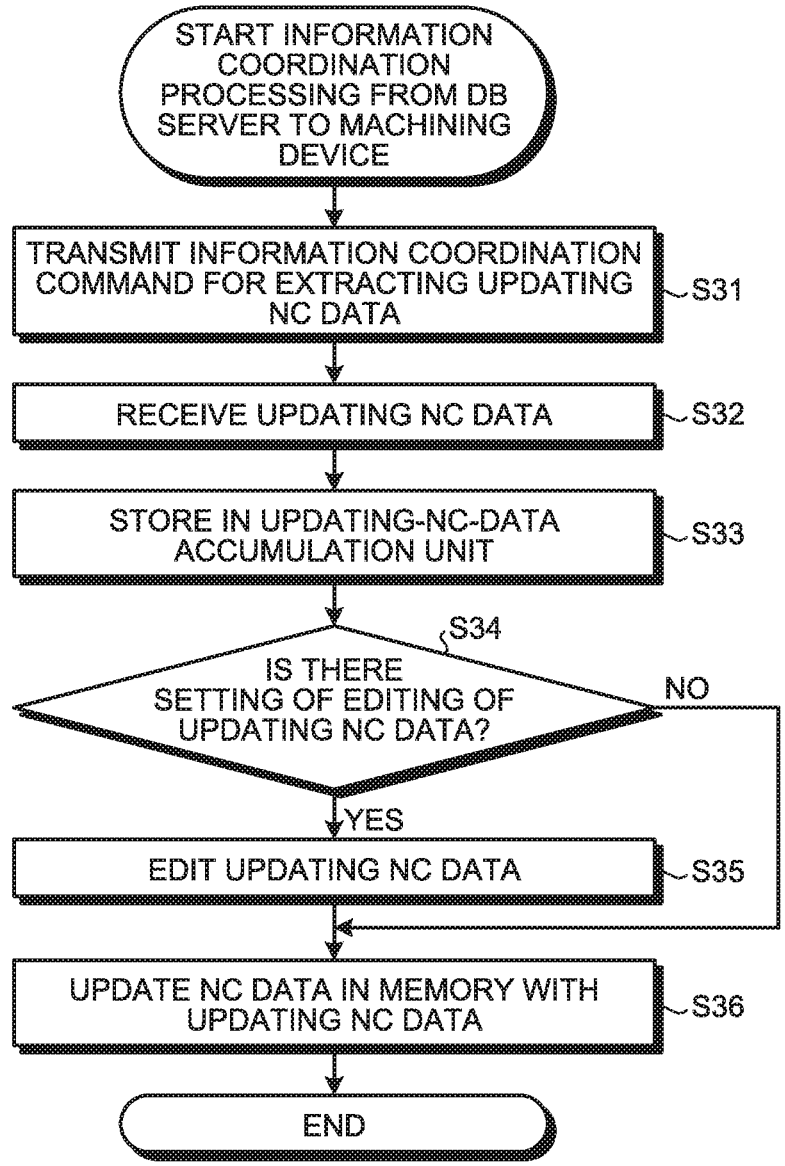

FIG. 14 is a flowchart illustrating an example of a procedure performed in an information coordination task while processing is taking place to coordinate information from a database server with a machining device in the information coordination system.

DESCRIPTION OF EMBODIMENTS

Exemplary embodiments of a numerical control device, an information coordination system, and an information coordination program according to the present invention will be explained below in detail with reference to the accompanying drawings. Note that the present invention is not limited to the embodiments.

Figure 1:
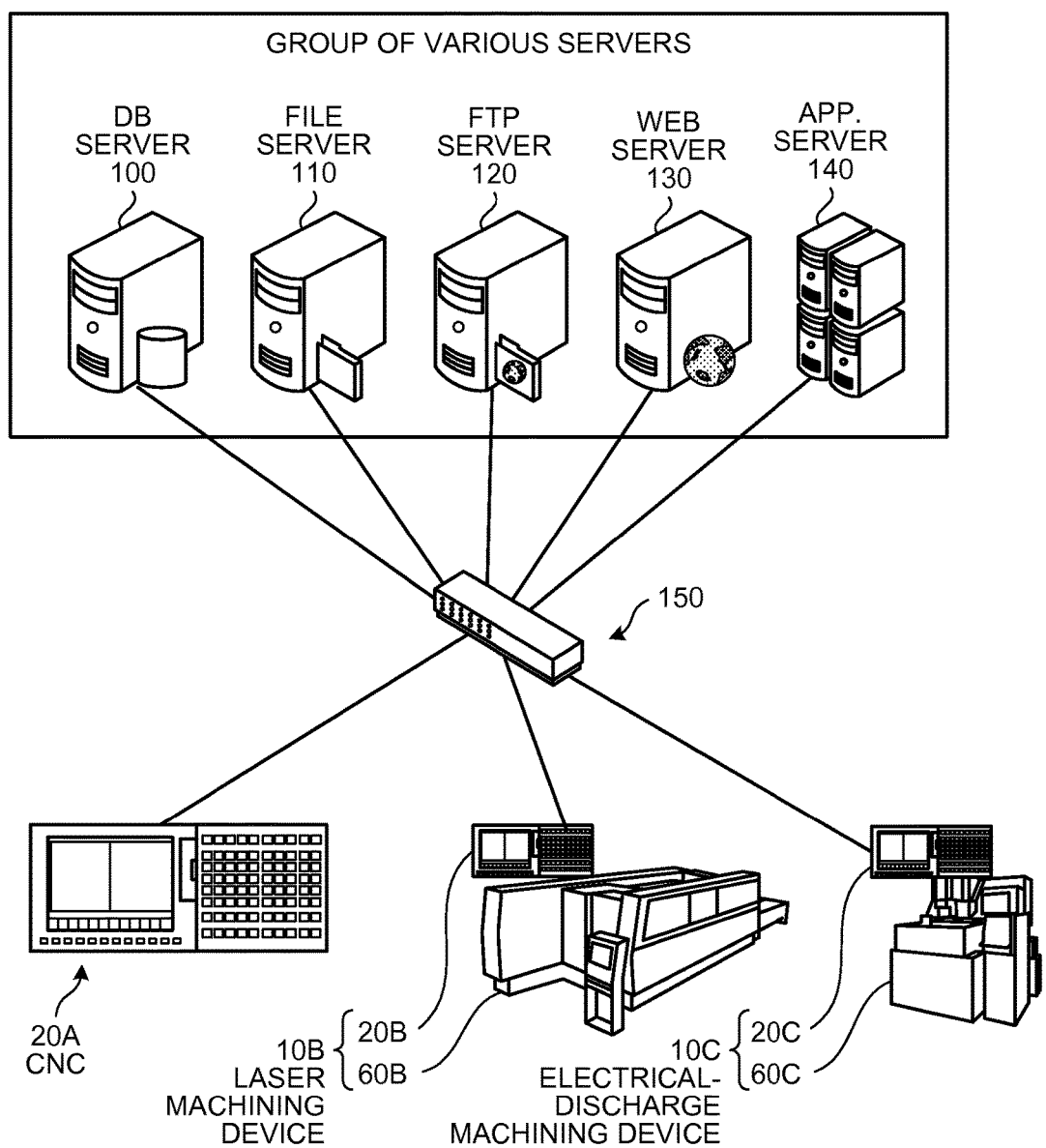
FIG. 1 is a diagram schematically illustrating an example of the configuration of an information coordination system according to an embodiment of the present invention.

FIG. 1 is a diagram schematically illustrating an example of a configuration of an information coordination system according to an embodiment of the present invention. The information coordination system has a configuration in which a CNC device 20A that is an NC device or a machining device 10B and 10C having an NC device incorporated therein and a database server 100 that manages data (hereinafter, "NC data") to be used in the CNC device 20A or the machining device 10B or 10C in a database are connected via a network 150. The NC data is data according to a specific theme related to the NC device, exemplified by, for example, machining information concerning the NC device and the like.

The machining devices that can be used are a laser machining device 10B that machines a workpiece with a laser, an electrical-discharge machining device 10C that machines a workpiece with electrical discharges, and the like.

The laser machining device 10B is a machine tool developed to use a laser beam for machining or cutting processing that is difficult to perform with a conventional cutting tool. The laser machining device 10B has a drive unit 60B that machines a workpiece, and it has an instruction unit 20B that issues an instruction in accordance with an NC program to the drive unit 60B.

The electrical-discharge machining device 10C is a machine tool that adopts a machining method of removing a part of a workpiece surface with an electric arc repeatedly generated between an electrode and the workpiece for a short period. By using the electrical-discharge machining device, a complicated contour can be cut out from hardened metal, super hardened steel, titanium, carbide, or the like that cannot be cut by conventional machining techniques. The electrical-discharge machining device 10C has a drive unit 60C that machines a workpiece, and it has an instruction unit 20C that issues instructions in accordance with an NC program to the drive unit 60C.

The laser machining device 10B and the electrical-discharge machining device 100 have the instruction units 20B and 20C as NC devices incorporated therein and control the movements of machining units (tools) precisely, thereby implementing micromachining. Note that these are only examples and the machining devices are not limited thereto. For example, the present embodiment can be applied to any machining device that precisely controls the movement of a tool with an NC device incorporated in the machining device, thereby implementing micromachining.

The database server (in the drawings, "DB server") 100 is a server in which a database is included and a database management system runs. The database server 100 performs processing such as a search over the database according to a request from a client and returns a processing result to the client. While the present embodiment is related to the database server 100, it is not limited thereto. Many of the various servers that are currently in use have a form in which a database is mounted therein to manage information. Accordingly, any server having a database mounted therein may be related to the present embodiment even if the name of the server is not a database server. Examples of servers other than the database server 100 are a File server 110, an FTP (File Transfer Protocol) server 120, a Web server 130, and an App. (Application) server 140.

The File server 110 is a server that is provided to share files via a network such as a LAN (Local Area Network) or a WAN (Wide Area Network). The FTP server 120 is a server that performs transmission and reception of files using an FTP. The Web server 130 exchanges information using an HTTP (HyperText Transfer Protocol), which is one type of communication protocol. Upon reception of a request from a Web browser as a client, the Web server 130 transmits information such as an HTML (HyperText Markup Language) document or an image corresponding to the request. The Web server 130 is one of the essential elements for the buildout of a Website. The application server 140 is a server that has a function of executing programs in an application layer of a 3-layer model in which a professional commercial system is configured as three layers: a presentation layer, the application layer, and a data layer.

Figure 2:
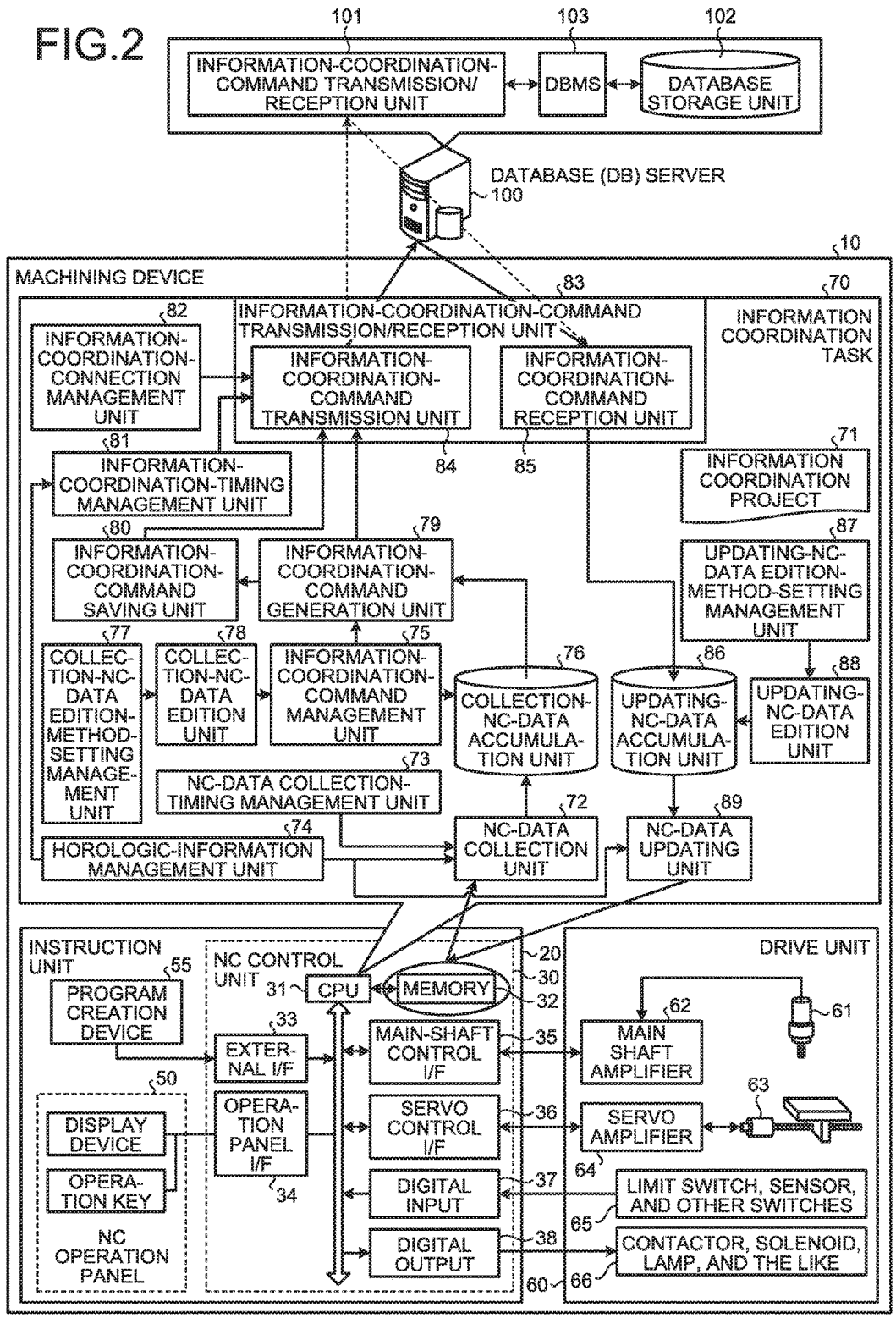
FIG. 2 is a block diagram schematically illustrating an example of the functional configuration of the information coordination system according to the embodiment.

FIG. 2 is a block diagram schematically illustrating an example of the functional configuration of the information coordination system according to the present embodiment. As described above, the information coordination system has a configuration in which the machining device 10 and the database server 100 serving as a numerical-control-data storage device are connected via a network.

The database server 100 has an information-coordination-command transmission/reception unit 101, a database storage unit 102, and a database management unit (in FIG. 2, DBMS) 103. The information-coordination-command transmission/reception unit 101 transmits to or receives from the machining device 10 an information coordination command to coordinate a database in the database storage unit 102 with specific NC information held in the NC device or the machining device 10 (hereinafter, collectively referred to as a "machining device") having the NC device (the instruction unit 20) incorporated therein.

The database storage unit 102 has NC information included in the machining device 10, such as an NC-control machine tool, the laser machining device 10B, or the electrical-discharge machining device 10C connected to the network, in the form of a database. The NC information in the database is subjected to information coordination with the machining device 10. The database management unit 103 performs processing corresponding to a request to access the database in the database storage unit 102.

The machining device 10 has the instruction unit 20 and the drive unit 60 serving as a machining unit. The drive unit 60 has a main shaft motor 61 that rotatively drives a main shaft controlled by a main shaft amplifier 62, the main shaft amplifier 62 driving the main shaft motor 61 thereby rotating the main shaft; a servo motor 63 that executes control of a position or a speed of a tool or the like using a servo amplifier 64, the servo amplifier 64 driving the servo motor 63; a limit switch, a sensor, and other switches 65 serving as input signal generators that obtain device statuses in the machining device 10; and a contactor, a solenoid, a lamp, and the like 66, which are operating units that operate according to an instruction from the instruction unit 20.

The instruction unit 20 has an NC control unit 30, an NC operation panel 50, and a program creation device 55. The NC operation panel 50 has a display device that displays information for operating the NC control unit 30 and an operation key that provides an instruction to the NC control unit 30. The program creation device 55 creates a machining program (an NC program) including a tool route, a machining condition, and the like required for machining by the machining device and it is represented in the form of a command to the NC control unit 30. The machining program can be downloaded from the program creation device 55 to the NC control unit 30 or can be created through a direct input from the NC operation panel 50 and introduced into the NC control unit 30.

The NC control unit 30 has a CPU 31; a memory 32; an external I/F 33 as a communication interface with an external device such as the program creation device 55; an operation panel I/F 34 as a communication interface with the NC operation panel 50; a main-shaft control I/F 35 as a communication interface with the main shaft amplifier 62; a servo control I/F 36 as a communication interface with the servo amplifier 64; a digital input I/F 37 as a communication interface with the limit switch, the sensor, and other switches 65; and a digital output I/F 38 as a communication interface with the contactor, the solenoid, the lamp 66 and the like.

The memory 32 stores therein a machining program (the NC program) required for machining, data used in calculating that follows the machining program or output as a result of the calculating, and NC data subjected to information coordination with the database server 100. The data is stored in a volatile memory or a nonvolatile memory depending on the application.

An information coordination program for enabling information coordination with the database server 100 is also stored in the memory 32. In the present embodiment, the information coordination program is implemented by implementing procedures that perform information coordination with the database server 100 as a new task (hereinafter, "information coordination task") in the NC device (the instruction unit 20) and mounting the NC device on the machining device 10.

The information coordination task includes an information coordination project 71; an NC-data collection unit 72 serving as a numerical-control-data collection unit; an NC-data collection-timing management unit 73; a horologic-information management unit 74; an information-coordination-command management unit 75; a collection-NC-data accumulation unit 76 serving as a numerical-control-data accumulation unit; a collection-NC-data edition-method-setting management unit 77; a collection-NC-data edition unit 78 serving as a numerical-control-data edition unit; an information-coordination-command generation unit 79 serving as an information-coordination-command generation unit; an information-coordination-command saving unit 80; an information-coordination-timing management unit 81; an information-coordination-connection management unit 82; an information-coordination-command transmission/reception unit 83; an updating-NC-data accumulation unit 86 serving as an updating-numerical-control-data accumulation unit; an updating-NC-data edition-method-setting management unit 87; an updating-NC-data edition unit 88 serving as an updating-numerical-control-data edition unit; and an NC-data updating unit 89 serving as a numerical-control-data updating unit.

The information coordination project 71 records therein setting information of respective operations of the processing units at a time when an information coordination task 70 is executed when the NC device performs information coordination with the database server 100. The setting information is set by an operator, for example, via the NC operation panel 50 or an external device. The processing units perform processing by referring to the information coordination project 71.

Figure 3:
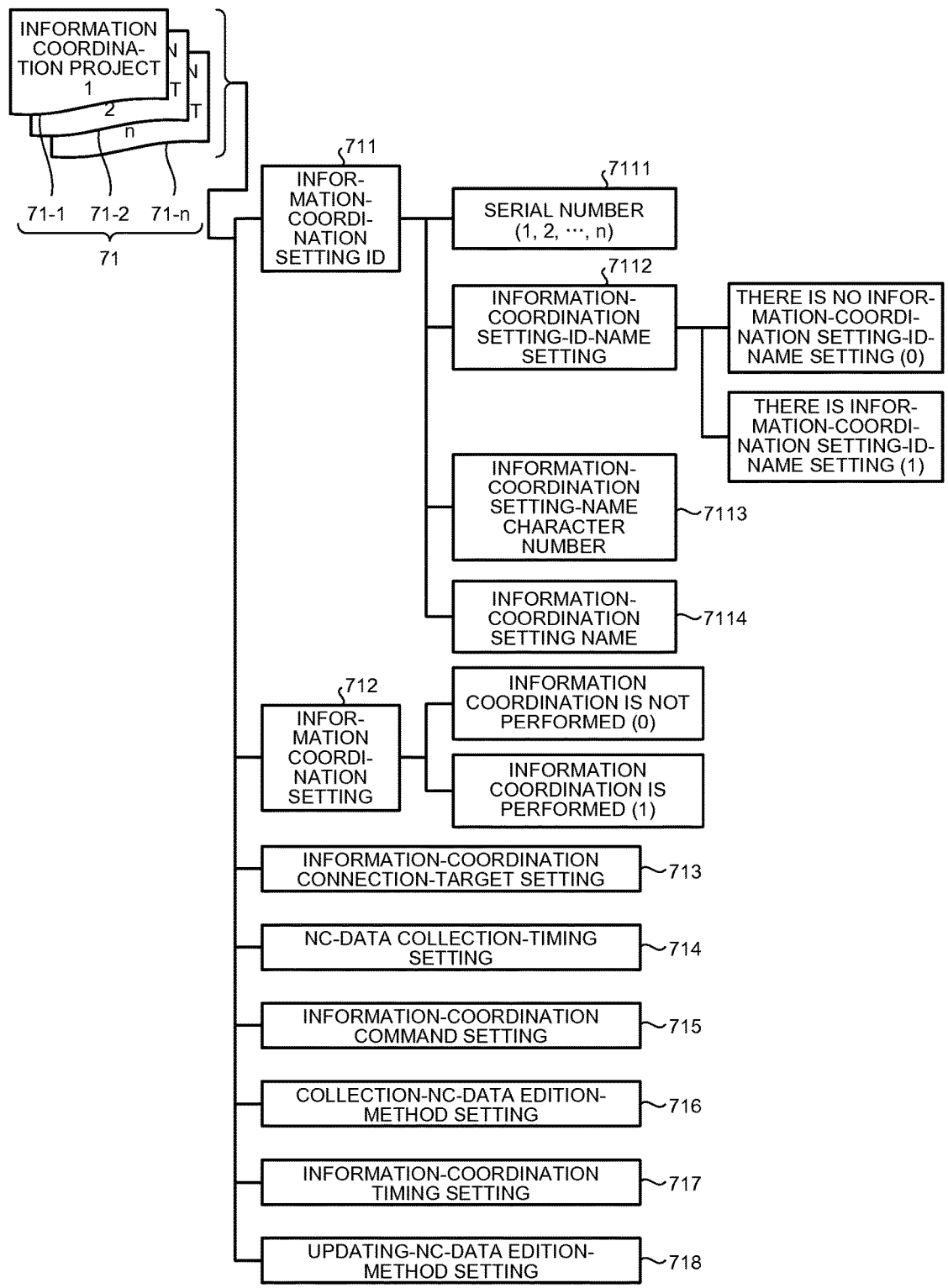
FIG. 3 is a diagram illustrating an example of the data structure of an information coordination project.

FIG. 3 is a diagram illustrating an example of the data structure of the information coordination project. The information coordination project 71 includes an information-coordination setting ID 711; an information coordination setting 712; an information-coordination connection-target setting 713; an NC-data collection-timing setting 714; an information-coordination command setting 715; a collection-NC-data edition-method setting 716; an information-coordination timing setting 717; and an updating-NC-data edition-method setting 718.

The information-coordination setting ID 711 is information for identifying the information coordination project 71. The information-coordination setting ID 711 includes a serial number 7111; an information-coordination setting-ID-name setting 7112; an information-coordination setting-name character number 7113; and an information-coordination setting name 7114. The serial number 7111 uniquely identifies (specifies with numbers or values) plurality of information coordination projects 71-1, 71-2, . . . , 71-n and numbers such as 1, 2, . . . , n are assigned. Note that the serial number 7111 is an example and any form can be used as long as it can uniquely identify the information coordination project 71.

The information-coordination setting-ID-name setting 7112 manages whether there is a name set for the information coordination project 71 identified by the information-coordination setting ID 711. For example, "0" is input when there is no information-coordination setting-ID name, and "1" is input when there is an information-coordination setting-ID name. When there is an information-coordination setting-ID name, the number of characters of the name of the information coordination project 71 set by the operator is input in the information-coordination setting-name character number 7113. When there is an information-coordination setting-ID name, the name of the information coordination project 71 set by the operator is input in the information-coordination setting name 7114. The information-coordination setting-ID-name setting 7112, the information-coordination setting-name character number 7113, and the information-coordination setting name 7114 are introduced to facilitate management of the information coordination project 71 by the operator and are set as necessary.

The information coordination setting 712 is information that designates whether to cause the information coordination project 71 to function and actually perform the information coordination between the machining device 10 (the instruction unit 20) and the database server 100. For example, "0" is input when the information coordination is not to be performed, and "1" is input when the information coordination is to be performed. Because the information coordination project 71 can be managed using the information-coordination setting ID 711 in this example, a plurality of the information coordination projects 71-1 to 71-n can be configured. In the machining device 10 according to the present embodiment, which one of the information coordination projects 71-1 to 71-n is to be caused to function can be designated by setting the information coordination setting 712 according to a request of the system. While "1" indicating that the information coordination is to be performed is applied during a normal use, whether the setting is valid/invalid can be easily switched by the information coordination setting 712 because whether to perform the information coordination depends on a system requirement.

Figure 4:
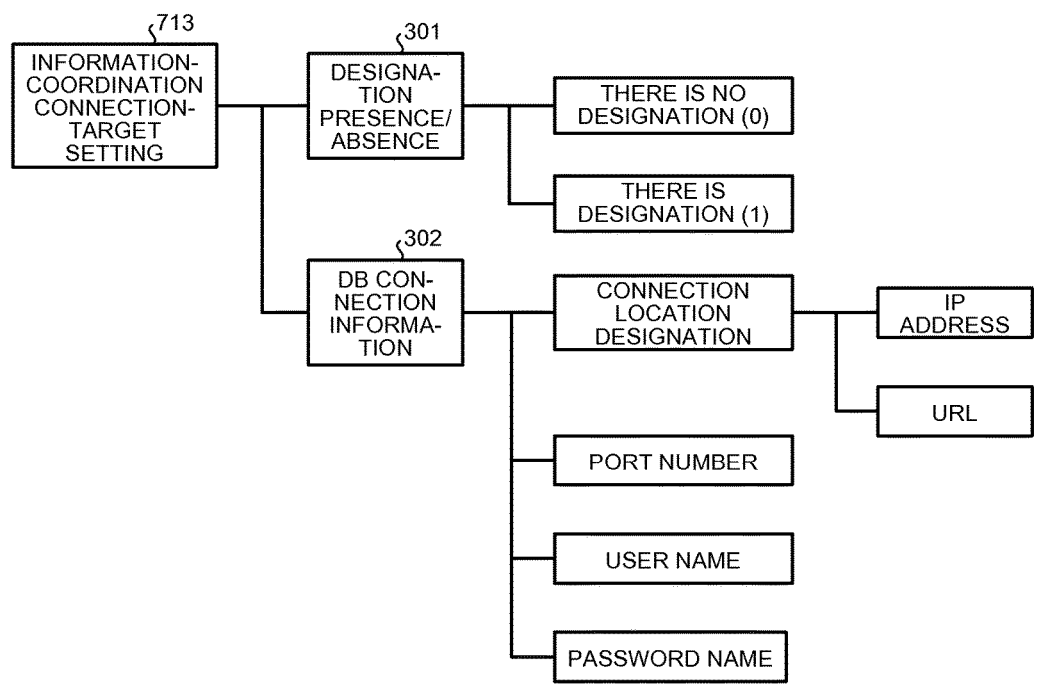
FIG. 4 is a diagram illustrating an example of the data structure of an information-coordination connection-target setting.

The information-coordination connection-target setting 713 is information that designates logical identification information in a database with which the machining device 10 according to the present embodiment performs information coordination, and it is managed by the information-coordination-connection management unit 82. FIG. 4 is a diagram illustrating an example of the data structure of an information-coordination connection-target setting. The information-coordination connection-target setting 713 has a designation of presence/absence 301 that determines whether there is a designation of an information-coordination connection target; and a database connection information 302 in a case where there is a designation of an information-coordination connection target. Set up in the database connection information 302 are a port number used for connection, location information such as an IP (Internet Protocol) address or a URL (Uniform Resource Locator), a user name, and a password for ensuring security, and the like.

Figure 5:
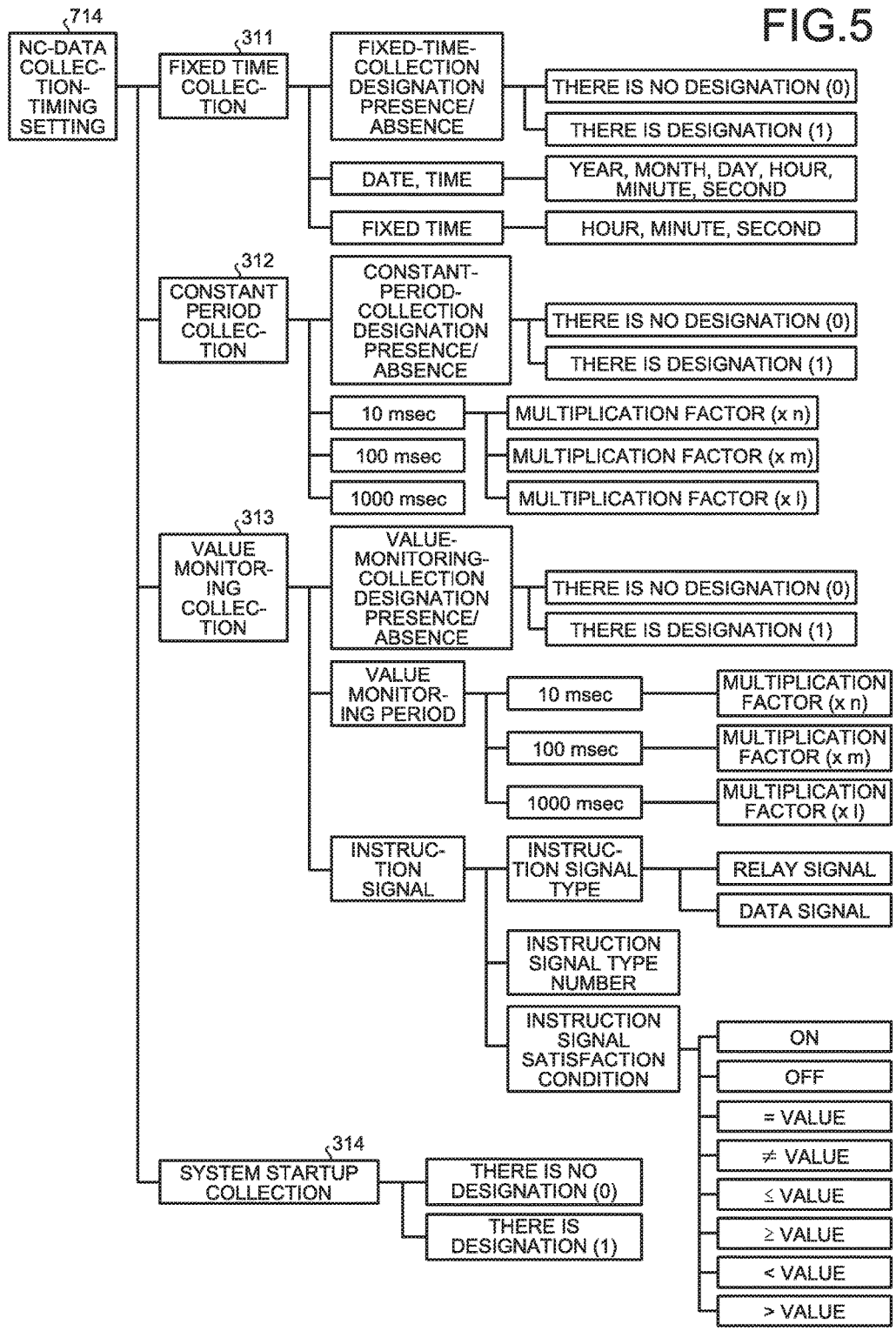
FIG. 5 is a diagram illustrating an example of the data structure of an NC-data collection-timing setting.

The NC-data collection-timing setting 714 is information that designates the time when the machining device 10 according to the present embodiment collects NC data stored in the memory 32 of the NC control unit 30; and it is managed by the NC-data collection-timing management unit 73. FIG. 5 is a diagram illustrating an example of the data structure of an NC-data collection-timing setting. The contents of the NC-data collection-timing setting 714 trigger the collection of NC data by the machining device 10. Subsequently, on the basis of the contents set in the NC-data collection-timing setting 714, the information coordination task operates and checks the contents of the designated NC data.

In the example illustrated in FIG. 5, a fixed time collection 311, a constant period collection 312, a value monitoring collection 313, and a system startup collection 314 are set as the NC-data collection-timing setting 714. The fixed time collection 311 sets whether to perform collection of NC data to be subjected to information coordination when a status changes from false to true in a case where a current date and time or day of the week matches a designated date and time or day of the week. When collection of NC data is to be performed at a fixed time, details such as the date and time are set. In this example, a status where the designated date and time or day of the week has come is "true"; and other statuses, i.e., statuses before or after the designated date and time or day of week, are "false". The constant period collection 312 sets whether to perform collection of NC data when a status changes from false to true while the statuses of true and false are repeated at designated periodical intervals (the unit is a second, for example). When collection of NC data is to be performed with a predetermined period, details such as the period are set.

The value monitoring collection 313 sets whether to perform collection of NC data depending on when a condition is satisfied while the value of a signal designated in an item under "instruction signal" is monitored with a period set in a value monitoring period. When collection of NC data is performed using a signal instruction as a trigger, information such as the type of a signal to be monitored, a condition to be satisfied by the signal, and a period during which the signal is monitored is set. For example, assuming that a status where the designated signal satisfaction condition is matched is "true" and statuses where the designated signal condition is not satisfied before and after the status "true" are "false", collection of NC data is performed when the status changes from "false" to "true" while the value of a signal having the designated period is monitored. In this example, the value monitoring period is a period during which the information coordination task 70 monitors a value of the memory 32 in the NC control unit 30. Although the value monitoring period is equal to the collection period of the constant period collection 312, there is no signal designation in the value monitoring collection 313 unlike the case of the setting of the constant period collection 312. That is, (a setting of) the value monitoring period is a period for monitoring, using a certain signal that has stored therein a certain value as a trigger, a signal that has stored therein a value for reading another value (a value to be stored in the database server 100) of the memory 32 in the NC control unit 30. A time interval (=a period) for recognizing a value is the value monitoring period. A status (that is, a value) of the signal changes in some cases and does not change in other cases. The system startup collection 314 sets whether to perform collection of NC data when the machining device 10 of the information coordination system starts.

The information-coordination command setting 715 is information that designates a type of a communication command to be used when the machining device 10 according to the present embodiment performs information coordination with a database, and it is managed by the information-coordination-command management unit 75. The communication command differs according to the type of database to be connected. In recent years, databases are, however, generally operated using an SQL, and thus an SQL command is used as an example in the present embodiment. Specifically, the name of a table in the database server 100 with which information coordination is performed and items in the table are designated.

Figure 6:
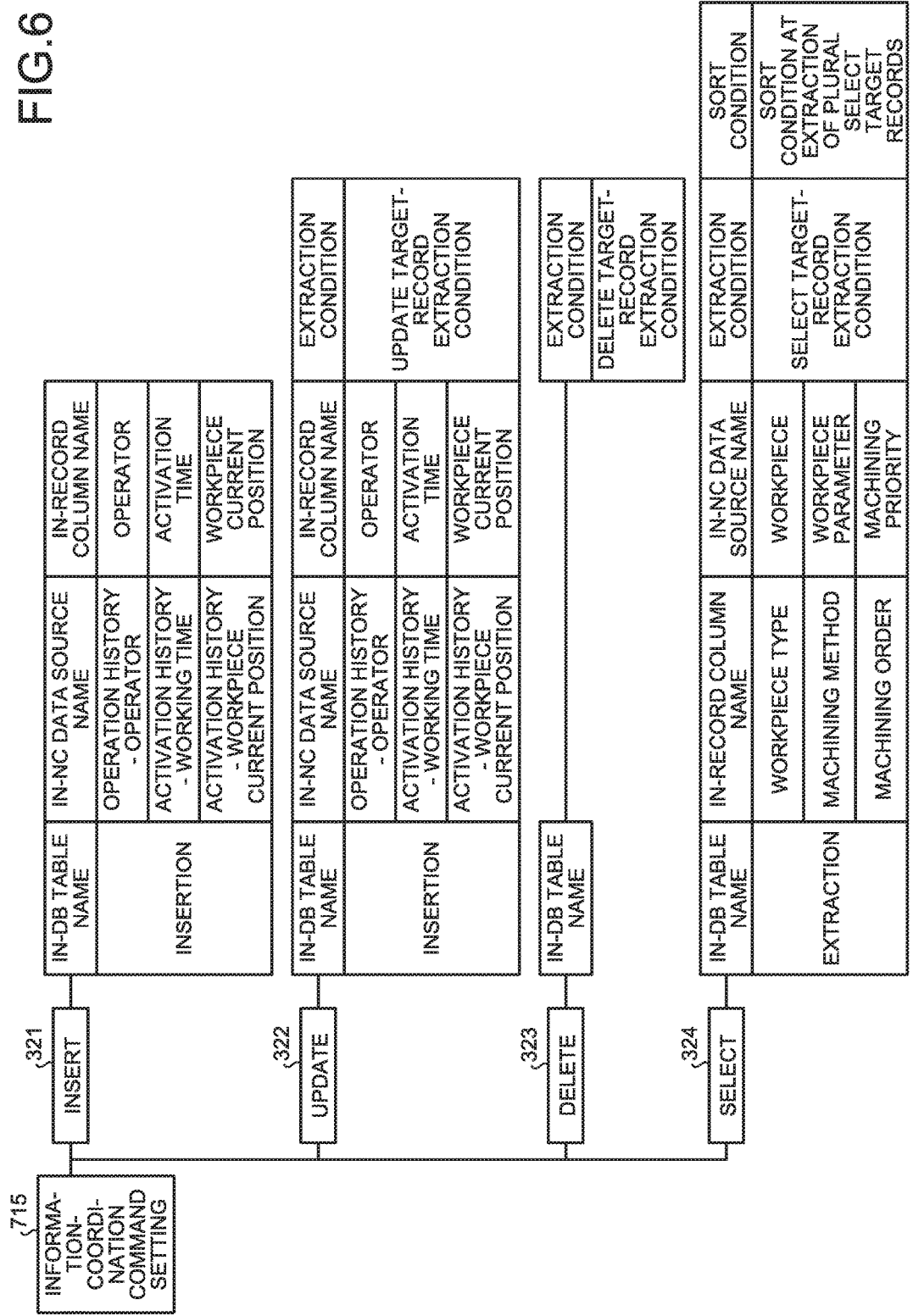
FIG. 6 is a diagram illustrating an example of the data structure of an information-coordination command setting.

FIG. 6 is a diagram illustrating an example of the data structure of an information-coordination command setting. An "INSERT" command 321 for instructing that data be added to a database, an "UPDATE" command 322 for instructing that data be updated in a database, a "DELETE" command 323 for instructing that data in a database be deleted, and a "SELECT" command to instruct that data in a database be acquired are types of SQL command and are exemplified here. The information-coordination command setting 715 includes the commands 321 to 322, names of tables in the database server with which the information coordination is performed, in-record column names indicating names of records in the tables subjected to the information coordination, in-NC data source names indicating names of records in NC data corresponding to the in-record column names in the tables, and the like.

For example, the "INSERT" command 321 is set with a name (a table name) of a table into which a data string is to be inserted, column names in the table, and data strings corresponding to the column names. The "UPDATE" command 322 is set with the name of a table having a data string to be updated, column names in the table, data strings corresponding to the column names, and an extraction condition of records to be updated. The "DELETE" command 323 is set with a name of a table that is expected to include records to be deleted; and an extraction condition of the records to be deleted are set. With respect to the "SELECT" command, a name of a table that is expected to include records to be read, an extraction condition of the records to be read, and a sort condition thereof are set.

Figure 7:
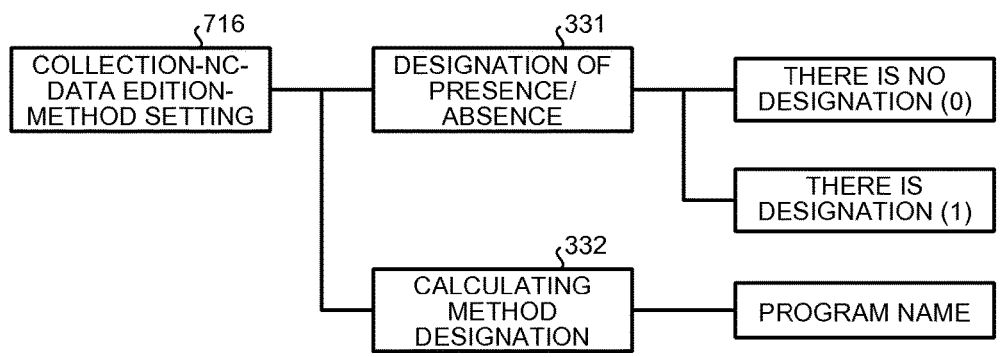
FIG. 7 is a diagram illustrating an example of a data structure of a collection-NC-data edition-method setting.

The collection-NC-data edition-method setting 716 is information that has a setting as to whether it is necessary to perform editing of NC data collected before the machining device 10 according to the present embodiment performs information coordination with the database server 100 and that has a setting for an editing method (a program) when the editing is necessary, and it is managed by the collection-NC-data edition-method-setting management unit 77. FIG. 7 is a diagram illustrating an example of a data structure of a collection-NC-data edition-method setting. As illustrated in FIG. 7, the collection-NC-data edition-method setting 716 has a designation of presence/absence 331 that designates whether to perform editing before the information coordination, and a calculating method designation 332 that designates a program name as an editing method when the editing is designated.

Figure 8:
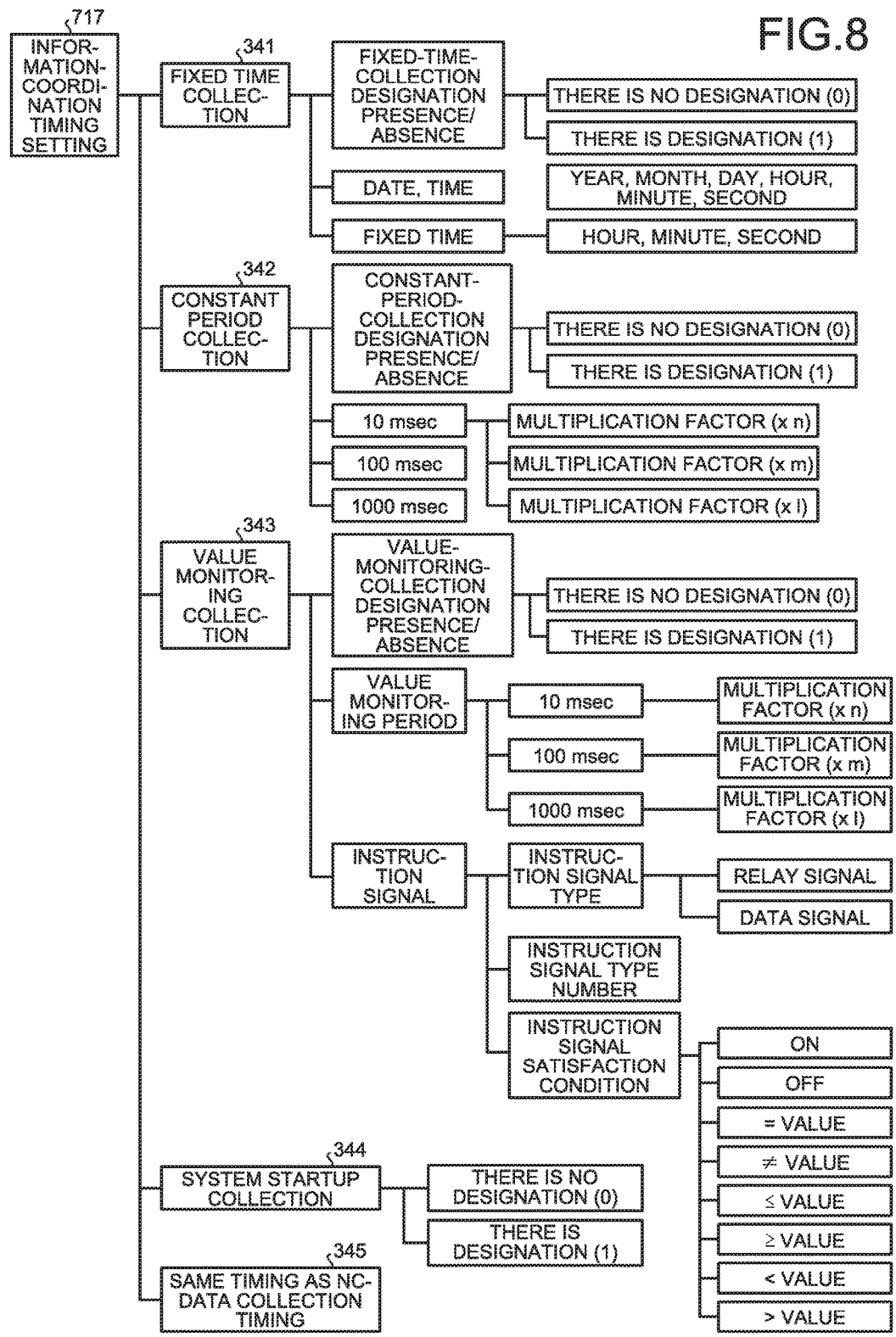

The information-coordination timing setting 717 is information designating a time when the machining device 10 according to the present embodiment performs information coordination with the database server 100, and it is managed by the information-coordination-timing management unit 81. FIG. 8 is a diagram illustrating an example of a data structure of an information-coordination timing setting. The setting contents of the information-coordination timing setting 717 trigger information coordination of the machining device 10 with the database server 100. The information coordination task 70 operates and the information coordination is performed between the machining device 10 and the database server 100 according to the contents of the information-coordination timing setting 717.

In the example illustrated in FIG. 8, the information-coordination timing setting 717 includes a fixed time collection 341, a constant period collection 342, a value monitoring collection 343, a system startup collection 344, and a same timing 345 as the NC-data collection time that is set. Because the fixed time collection 341, the constant period collection 342, the value monitoring collection 343, and the system startup collection 344 are the same as those in the NC-data collection-timing setting 714 in FIG. 6, descriptions thereof will be omitted. The same timing 345 as the NC-data collection time is selected when the NC-data collection-timing setting 714 does not need to be different from the information coordination time.

The updating-NC-data edition-method setting 718 is information that sets the necessity of editing after the machining device 10 according to the present embodiment extracts NC data (hereinafter, "updating NC data") to be set in the machining device 10 from the database server 100 and before the updating NC data is decompressed in the machining device 10 and that sets an editing method (a program) when the editing is necessary; and it is managed by the updating-NC-data edition-method-setting management unit 87. FIG. 9 is a diagram illustrating an example of a data structure of an updating-NC-data edition-method setting. As illustrated in FIG. 9, the updating-NC-data edition-method setting 718 has a designation of presence/absence 351 that designates whether to perform editing after the updating NC data is extracted from the database server 100 and before the updating NC data is decompressed in the machining device 10 (the memory 32 of the NC control unit 30), and it has a designation of a calculating method designation 352 that designates a program name as an editing method when the editing is designated.

The processing units that constitute the information coordination task are described here by referring back to FIG. 2. The NC-data collection unit 72 collects NC data from the memory 32 of the machining device 10 (the NC control unit 30) according to the contents in the "in-NC data source names" as extraction targets of the information-coordination command setting 715 when determining that the time for collecting NC data has been reached on the basis of the contents in the NC-data collection-timing setting 714 of the information coordination project 71, current date and time information, a constant-period interruption interval, and the like. For example, referring to the "INSERT" command in the information-coordination command setting 715 in FIG. 6, because "operation history—operator", "movement history—working time", and "activation history—workpiece current position" are registered as the "in-NC data source names", data corresponding to these source names are collected.

The NC-data collection-timing management unit 73 manages the NC-data collection-timing setting 714 in the information coordination project 71. Specifically, in order to generate the NC-data collection-timing setting 714, the NC-data collection-timing management unit 73 displays a setting screen on a display device of the NC operation panel 50 and stores a value input to the setting screen by the operator through an operation key as the NC-data collection-timing setting 714 of the information coordination project 71.

The horologic-information management unit 74 manages information related to the time. For example, current date and time information or count information in a case where interruptions are performed periodically is exemplified as the information related to the time. The NC-data collection unit 72 and the information-coordination-timing management unit 81 are notified of the information.

The information-coordination-command management unit 75 manages the information-coordination command setting 715 in the information coordination project 71. As illustrated in FIG. 6, the information-coordination command setting 715 includes use conditions and the like of commands to be used when information coordination between the NC data in the memory 32 of the machining device 10 and the data in the database server 100 is performed. The information-coordination command setting 715 is input by a user and the information-coordination-command management unit 75 manages contents of the setting input by the user.

The collection-NC-data accumulation unit 76 stores (accumulates) therein NC data in the memory 32 of the machining device 10 collected by the NC-data collection unit 72. The collected NC data is hereinafter also referred to as "collection NC data". FIG. 10 is a diagram illustrating an example of a data structure of collection NC data. The collection NC data has a table structure and has storage areas corresponding to the table name and the column names in the database server 100 for performing the information coordination with data source names in the memory 32 of the machining device 10 on the basis of the information-coordination command setting 715. In this example, the collection NC data has the "information-coordination setting ID" 711; an "in-database table name" as the name of a table of the database in the database server 100 with which the coordination is performed; "in-NC data source names" as items to be extracted from the NC data in the machining device 10; and "in-record column names" as items in the database server 100 corresponding to the "in-NC data source names". When NC data is collected from the machining device 10, data corresponding to the "in-record column names" is not extracted. A serial number is stored as the information-coordination setting ID 711; and extracted are the data having "insertion" as the table name of the database being a collection target and having "operation history— operator", "activation history—working time", and "activation history—workpiece current position" as the data source names being the collection target.

The collection-NC-data edition-method-setting management unit 77 manages an editing method of the collection NC data in the information coordination project 71. Specifically, the collection-NC-data edition-method-setting management unit 77 sets contents of editing to be performed in the collection NC data as illustrated in FIG. 7 on the basis of an input by the user.

The collection-NC-data edition unit 78 performs editing of the collection NC data accumulated in the collection-NC-data accumulation unit 76 on the basis of the contents in the collection-NC-data edition-method setting 716 when the editing is designated in the collection-NC-data edition-method setting 716 by a setting of the user or the system. For example, the collection-NC-data edition unit 78 performs editing of the collection NC data according to the program designated in the calculating method designation 332 of the collection-NC-data edition-method setting 716 in FIG. 7. Accordingly, the collection-NC-data edition unit 78 edits storage areas corresponding to the "in-record column names" of the NC data in the collection-NC-data accumulation unit 76. That is, data obtained by editing data stored in the "in-NC data source names" is stored in the "in-record column names", respectively. Storage areas having the same names as the "in-NC data source names" are not regarded as target spaces for an editing function to enable the NC-data collection unit 72 to always store data therein.

The information-coordination-command generation unit 79 generates an information coordination command on the basis of the information-coordination command setting 715 in the information coordination project 71. The information-coordination-command generation unit 79 transfers the generated information coordination command to an information-coordination-command transmission unit 84 and transfers a copy of the information coordination command to the information-coordination-command saving unit 80.

The information-coordination-command saving unit 80 transfers the copy of the information coordination command generated by the information-coordination-command generation unit 79 to the information-coordination-command saving unit 80 and stands ready to retransmit the data in case a communication failure occurs.

The information-coordination-timing management unit 81 determines whether an information coordination time has been reached on the basis of the information-coordination connection-target setting in the information coordination project 71 and the horologic information from the horologic-information management unit 74; and it notifies the information-coordination-command transmission unit 84 that the information coordination time has been reached when the information coordination time has been reached. The information-coordination-connection management unit 82 manages the information-coordination connection-target setting 713 in the information coordination project 71.

The information-coordination-command transmission/reception unit 83 has the information-coordination-command transmission unit 84 serving as an information-coordination-command transmission unit and an information-coordination-command reception unit 85 serving as an information-coordination-command reception unit. The information-coordination-command transmission unit 84 transmits the information coordination command generated by the information-coordination-command generation unit 79 to the database in the database server 100 connected to the network on the basis of the information-coordination connection setting in the information coordination project 71 when the information coordination time, notification of which comes from the information-coordination-timing management unit 81, has been reached. The information-coordination-command reception unit 85 receives an information coordination command from the database server 100 (for example, a response to the "SELECT" command received from the database server 100) and accumulates NC data required to change NC data in the memory 32 associated with the information coordination command in the updating-NC-data accumulation unit 86. For the NC device to perform coordination with the database server 100, it is necessary that the NC device and the database server 100 are logically connected to each other. NC data, which is received from the database server to update the NC data in the memory 32, is hereinafter also referred to as "updating NC data".

The updating-NC-data accumulation unit 86 stores therein the updating NC data obtained from the database server 100. The updating NC data is NC data to be used for the control in the machining device 10 and is information for updating the currently-stored NC data. FIG. 11 is a diagram illustrating an example of a data structure of updating NC data. The updating NC data has a table structure and has storage areas corresponding to names of data that is subjected to information coordination in the machining device 10 and a table name and data names in the database server 100 as targets of the information coordination on the basis of the information-coordination command setting 715. In this example, the updating NC data includes the information-coordination setting ID 711; an "in-database table name" in the database server 100 with which information coordination is performed; "in-NC data source names" as items of data that are to be subjected to the information coordination in the machining device 10; and "in-record column names" as items corresponding to the "in-NC data source names" in the database server 100. The example of FIG. 11 illustrates a case where a serial number is stored as the information-coordination setting ID 711; and data having in-record column names "workpiece type", "machining method", and "machining order" is extracted from the in-database table name "extraction".

The updating-NC-data edition-method-setting management unit 87 manages the updating-NC-data edition-method setting 718. Specifically, the updating-NC-data edition-method-setting management unit 87 manages contents of editing to be performed on the updating NC data obtained from the database server 100 on the basis of an input by the user as illustrated in FIG. 9.

The updating-NC-data edition unit 88 performs editing of the updating NC data accumulated in the updating-NC-data accumulation unit 86 on the basis of the contents in the updating-NC-data edition-method setting 718 when editing is designated in the updating-NC-data edition-method setting 718 by a setting of the user or the system. For example, the updating-NC-data edition unit 88 performs editing of the updating NC data according to the program designated in the calculating method designation of the updating-NC-data edition-method setting 718 in FIG. 9. Here, the updating-NC-data edition unit 88 can edit storage areas corresponding to the "in-NC data source names" of the updating NC data in the updating-NC-data accumulation unit 86. That is, data obtained by editing data stored in the "in-record column names" is stored in the "in-NC data source names", respectively. Because data in the NC device cannot be directly edited, the processing is performed using a storage space in the updating-NC-data accumulation unit 86. The storage areas corresponding to the "in-record column names" are not regarded as targets for an editing function by the updating-NC-data edition unit 88 in order to enable a SELECT response to be always received.

The NC-data updating unit 89 updates the NC data in the memory 32 of the machining device 10 (the NC control unit 30) using the updating NC data in the updating-NC-data accumulation unit 86 on the basis of the current date and time information, the constant-period interruption interval, and the like.

Information coordination processing performed by the NC device configured in this way is described next. FIG. 12 is a flowchart illustrating an example of a procedure performed during an information coordination task while processing the coordination of information from a machining device with a database server in the information coordination system. First, the NC-data collection unit 72 determines whether the collection time defined in the NC-data collection-timing setting 714 has been reached (Step S11). When the collection time has not yet been reached (NO at Step S11), the NC-data collection unit 72 is kept in a waiting state until the collection time has been reached. When the collection time has been reached (YES at Step S11), the NC-data collection unit 72 collects NC data from the memory 32 (data memory) of the NC control unit 30 and stores the collected NC data in the collection-NC-data accumulation unit 76 (Step S12).

Next, whether editing of the collection NC data is set in the collection-NC-data edition-method setting 716 is determined (Step S13). When the editing is set (YES at Step S13), the collection NC data is edited on the basis of the contents in the collection-NC-data edition-method setting 716 (Step S14). Thereafter, or when it is determined at Step S13 that the editing is not set (NO at Step S13), the information-coordination-command generation unit 79 generates an information coordination command for (performing information coordination of) the collection NC data stored in the collection-NC-data accumulation unit 76 to be transmitted to the database server 100 on the basis of the information-coordination command setting 715 (Step S15). The "INSERT" command is used when new collection NC data is to be registered in the database server 100; the "UPDATE" command is used when a part of the collection NC data is to be updated; and the "DELETE" command is used when the collection NC data is to be deleted.

The information-coordination-command generation unit 79 transfers the generated information coordination command to the information-coordination-command transmission unit 84 and also copies the generated information coordination command so as to transfer the copy to the information-coordination-command saving unit 80 (Step S16). This is the preparation for the data to be retransmitted in case a communication failure occurs between the machining device 10 and the database server 100.

Subsequently, the information-coordination-command transmission unit 84 determines whether the information coordination time, defined in the information-coordination timing setting 717, has been reached (Step S17). When the information coordination time has not yet been reached (NO at Step S17), the information-coordination-command transmission unit 84 is kept in a waiting state until the information coordination time has been reached. When the information coordination time has been reached (YES at Step S17), the information-coordination-command transmission unit 84 transmits the information coordination command to the database server 100 (Step S18) for information coordination to be perform. In this way, the information coordination processing of reflecting the NC data in the machining device 10 in the database server 100 is completed.

FIG. 13 are sequence diagrams illustrating an example of a procedure of information coordination between the NC device and the database server. FIG. 13(*a*) illustrates a normal processing procedure and FIG. 13(*b*) illustrates a processing procedure in a case where a failure occurs. Processing described below is performed by the information-coordination-command transmission unit 84 in the information-coordination-command transmission/reception unit 83 of the information coordination task 70.

The normal processing procedure is first described with reference to FIG. 13(*a*). First, when the system is started, processing for establishing a session between the machining device 10 and the database server 100 is performed. Specifically, the information-coordination-command transmission/reception unit 83 of the NC device recognizes the database server 100 to be connected according to the setting contents in the information-coordination connection-target setting 713 and performs DB opening processing to open the database (SQ11).

Next, to start transmission of an information coordination command, the machining device 10 transmits a transaction start request to the database server 100 (SQ21). Subsequently, the machining device 10 transmits (executes) an SQL statement as the information coordination command illustrated at Step S18 in FIG. 12 (SQ22). When transmission of all SQL statements is completed and data change processing by the transaction processing ends normally, the commitment processing is determined to be an effective result, and the commitment processing reflects the result into the database (SQ23). Normally, processing from the transaction start request to the commitment is performed repeatedly.

Subsequently, DB closing processing to release the session established between the NC device and the database server 100 is performed when a system ends (SQ31).

The information coordination processing according to an information coordination command thus ends and information coordination between the NC device and the database server 100 is provided.

A processing procedure in a case where a failure occurs during the SQL statement execution processing is described next with reference to FIG. 13(*b*). It is assumed that a transaction start request is issued and that the system is in a state where the SQL statements are normally executed, as described with reference to FIG. 13(*a*) (SQ22(*n*−1)). Subsequently, when any failure occurs during execution of the SQL statements (SQ22(*n*)), the change processing before this time is determined to be ineffective and rollback processing to return the system to a state before execution of the transaction is performed (SQ25). Accordingly, the database of the database server 100 is returned to the original state.

FIG. 14 is a flowchart illustrating an example of a procedure performed in an information coordination task while processing information coordination from a database server to a machining device in the information coordination system. First, the machining device 10 transmits an information coordination command to the database server 100 to update NC data to be extracted (Step S31). As an acquisition request for the updating NC data, the "SELECT" command for data extraction to be performed is used. Details of a procedure before transmission of the acquisition request for the updating NC data are identical to that described with reference to FIG. 12, and thus descriptions thereof will be omitted.

Upon reception of the information coordination command including the acquisition request for the updating NC data, the database server 100 extracts the updating NC data according to the information coordination command and transmits the updating NC data to the machining device 10 via the information-coordination-command transmission/reception unit 83.

Upon reception of the updating NC data (Step S32), the information-coordination-command transmission/reception unit 83 in the information coordination task 70 of the machining device 10 stores the updating NC data in the updating-NC-data accumulation unit 86 (Step S33). Next, the updating-NC-data edition unit 88 determines whether editing of the updating NC data is set in the updating-NC-data edition-method setting 718 (Step S34). When the editing is set (YES at Step S34), the updating-NC-data edition unit 88 edits the updating NC data on the basis of the contents in the updating-NC-data edition-method setting 718 (Step S35). Thereafter, or when it is determined at Step S34 that the editing is not set (NO at Step S34), the NC-data updating unit 89 refers to the horologic information and updates the contents in the memory 32 of the machining device 10 with the updating NC data stored in the updating-NC-data accumulation unit 86 (Step S36). The updating processing of the NC data to the machining device 10 thus ends.

The information coordination method in the machining device 10 (the NC device) described above can be configured as a program having the processing procedure stored therein. The information coordination method can be implemented by causing the program to be executed by the machining device 10 (the NC device) described above. This program is recorded on a computer-readable recording medium such as a hard disk drive, an SSD (Solid State Drive), a Floppy® disk, a CD (Compact Disk)-ROM, an MO (Magneto-Optical disk), or a DVD (Digital Versatile Disk or Digital Video Disk). In this case, the program can be read from the recording medium by the machining device 10 (the NC device) or read from the recording medium by an information processing terminal such as an engineering tool connected to the machining device 10 (the NC device) and installed in the machining device 10 (the NC device) via the network to be read by the machining device 10 (the NC device). Alternatively, the program can be distributed via a network (a communication line) such as the Internet.

In the present embodiment, a function of collecting the NC data in the memory 32 of the machining device 10 (the NC device), generating an information coordination command for data to be updated in the database server 100 with the collected NC data, and transmitting the information coordination command, and a function of updating the NC data in the memory 32 of the machining device 10 (the NC device) with the updating NC data acquired from the database server 100 according to an instruction contained in the information coordination command are provided to the NC control unit 30 of the machining device 10. Accordingly, the NC data in the machining device 10 can be stored in the database server 100 without preparing a dedicated information processing terminal that has dedicated middleware and this external to the machining device 10. As a result, the present embodiment has an effect that the installation area of the entire system can be downsized and the cost related to administration and maintenance of the system can be reduced.

Because the processing of performing information coordination including accessing the database server 100 is set in the information coordination project 71, the operator does not create a program using programming technical terms required to acquire information from the database server 100. As a result, the present embodiment also has an effect that a complex program creation device is not required.

Furthermore, because the functions mentioned above are provided as dedicated tasks on the NC control unit 30 of the machining device 10, the machining device 10 can actively perform coordination with the database server 100. Further, by providing the functions as the dedicated tasks and selecting the priority and the operation period according to a system performance, there is an effect that the information coordination with the database server 100 can be performed without affecting the machining accuracy.

INDUSTRIAL APPLICABILITY

As described above, the numerical control device according to the present invention is useful for a system that coordinates databases connected via an electric communication line with NC information.

REFERENCE SIGNS LIST 10 machining device, 10B laser machining device, 10C electrical-discharge machining device, 20 instruction unit, 20A CNC device, 20B, 20C instruction unit, 30 NC control unit, 31 CPU, 32 memory, 50 NC operation panel, 55 program creation device, 60, 60B, 60C drive unit, 70 information coordination task, 71 information coordination project, 72 NC-data collection unit, 73 NC-data collection-timing management unit, 74 horologic-information management unit, 75 information-coordination-command management unit, 76 collection-NC-data accumulation unit, 77 collection-NC-data edition-method-setting management unit, 78 collection-NC-data edition unit, 79 information-coordination-command generation unit, 80 information-coordination-command saving unit, 81 information-coordination-timing management unit, 82 information-coordination-connection management unit, 83 information-coordination-command transmission/reception unit, 84 information-coordination-command transmission unit, 85 information-coordination-command reception unit, 86 updating-NC-data accumulation unit, 87 updating-NC-data edition-method-setting management unit, 88 updating-NC-data edition unit, 89 NC-data updating unit, 100 database server, 101 information-coordination-command transmission/reception unit, 102 database storage unit, 103 database management unit.

The invention claimed is:

1. A numerical control device including
a machining unit that machines a workpiece,
a data memory that stores therein numerical control data used during machining of the workpiece, and
a controller that performs calculating using data in the data memory and controls the machining unit,
wherein the numerical control device is used in an information coordination system in which the numerical control device and a numerical-control-data storage device, which has data including numerical control data that is used by the numerical control device stored therein as a database, are connected via a network to provide information coordination of the numerical control data between the numerical control device and the numerical-control-data storage device,
wherein the numerical control device further comprises:
a numerical-control-data collection unit that collects the numerical control data from the data memory when a condition, which is set in numerical-control-data collection-timing setting information that indicates whether the numerical control data is to be collected at a fixed time or at a constant period and defines a time when the numerical control data is to be collected from the data memory, is satisfied;
an information-coordination-command generation unit that generates an information coordination command to access the database in the numerical-control-data storage device so as to match data that corresponds to the numerical control device and is stored in the numerical-control-data storage device with the collected numerical control data based on an information-coordination command setting that designates a table in the database and items in the table when information coordination with the database is performed; and
an information-coordination-command transmission unit that transmits the information coordination command to the numerical-control-data storage device based on an information-coordination connection-target setting that designates logical identification information of the numerical-control-data storage device with which information coordination is performed, wherein
the numerical-control-data collection unit, the information-coordination-command generation unit, and the information-coordination-command transmission unit perform processing independently from control of the machining unit by the controller, and
the table includes an insert command for instructing data to be added to the database, an update command for instructing data in the database to be updated, or a delete command for instructing data in the database to be deleted.

2. The numerical control device according to claim 1, further comprising:
an information-coordination command reception unit that receives a response to the information coordination command, which is to extract updating numerical control data with which numerical control data in the numerical control device is to be updated, from the database in the numerical-control-data storage device; and
a numerical-control-data updating unit that updates the numerical control data stored in the data memory with the updating numerical control data included in the received response.

3. The numerical control device according to claim 1, wherein
the information-coordination-command transmission unit transmits the numerical control data to the numerical-control-data storage device based on information-coordination timing setting information that defines a time when the information coordination command is to be transmitted.

4. The numerical control device according to claim 1, further comprising:
a numerical-control-data accumulation unit that accumulates therein the numerical control data collected by the numerical-control-data collection unit; and
a numerical-control-data edition unit that edits the numerical control data accumulated in the numerical-control-data accumulation unit according to a predetermined condition, wherein
the information-coordination-command transmission unit transmits the edited numerical control data.

5. The numerical control device according to claim 2, further comprising:
an updating-numerical-control-data accumulation unit that accumulates therein the updating numerical control data included in the response received by the information-coordination command reception unit; and
an updating-numerical-control-data edition unit that edits the updating numerical control data accumulated in the updating-numerical-control-data accumulation unit according to a predetermined condition, wherein
the numerical-control-data updating unit updates the numerical control data stored in the data memory with the edited updating numerical control data.

6. An information coordination system comprising:
a numerical control device including
a machining unit that machines a workpiece,
a data memory that stores therein numerical control data used during machining of the workpiece, and
a controller that performs calculating using data in the data memory and controls the machining unit; and
a numerical-control-data storage device storing therein data that includes numerical control data used by the numerical control device as a database,
wherein the numerical control device and the numerical-control-data storage device are connected with each other via a network so as to provide information coordination of the numerical control data between the numerical control device and the numerical-control-data storage device,
wherein the numerical control device further includes:
a numerical-control-data collection unit that collects the numerical control data from the data memory when a condition, which is set in numerical-control-data collection-timing setting information that indicates whether the numerical control data is to be collected at a fixed time or at a constant period and defines a time when the numerical control data is to be collected from the data memory, is satisfied,
an information-coordination-command generation unit that generates an information coordination command to access the database in the numerical-control-data storage device so as to match data that corresponds to the numerical control device and is stored in the numerical-control-data storage device with the collected numerical control data based on an information-coordination command setting that designates a table in the database and items in the table when information coordination with the database is performed, and
an information-coordination-command transmission unit that transmits the information coordination command to the numerical-control-data storage device based on an information-coordination connection-target setting that designates logical identification information of the numerical-control-data storage device with which information coordination is performed, wherein
the numerical-control-data collection unit, the information-coordination-command generation unit, and the information-coordination-command transmission unit perform processing independently from control of the machining unit by the controller, and
the table includes an insert command for instructing data to be added to the database, an update command for instructing data in the databased to be updated, or a delete command for instructing data in the database to be deleted.

7. An information coordination program causing an information coordination system, wherein the information coordination system includes
a numerical control device including
a machining unit that machines a workpiece,
a data memory that stores therein numerical control data used during machining of the workpiece, and
a controller that performs calculating using data in the data memory and controls the machining unit; and
a numerical-control-data storage device storing therein data that includes numerical control data used by the numerical control device as a database,
wherein the numerical control device and the numerical-control-data storage device are connected with each other via a network, to provide information coordination of the numerical control data between the numerical control device and the numerical-control-data storage device,
wherein the information coordination program causes the numerical control device to execute:
a numerical-control-data collection procedure collecting the numerical control data from the data memory when a condition, which is set in numerical-control-data collection-timing setting information that indicates whether the numerical control data is to be collected at a fixed time or at a constant period and defines a time when the numerical control data is to be collected from the data memory, is satisfied;
an information-coordination-command generation procedure generating an information coordination command to access the database in the numerical-control-data storage device so as to match data that corresponds to the numerical control device and is stored in the numerical-control-data storage device with the collected numerical control data based on an information-coordination command setting that designates a table in the database and items in the table when information coordination with the database is performed; and
an information-coordination-command transmission procedure transmitting the information coordination command to the numerical-control-data storage device based on an information-coordination connection-target setting that designates logical identification information of the numerical-control-data storage device with which information coordination is performed, wherein
each of the procedures described above is performed independently from control of the machining unit by the controller, and
the table includes an insert command for instructing data to be added to the database, an update command for instructing data in the databased to be updated, or a delete command for instructing data in the database to be deleted.

8. The information coordination program according to claim 7, further causing the numerical control device to execute:
an information-coordination-command reception procedure receiving a response to the information coordination command, which is to extract updating numerical control data with which numerical control data in the numerical control device is to be updated, from the database in the numerical-control-data storage device; and
a numerical-control-data updating procedure updating the numerical control data stored in the data memory with the updating numerical control data included in the received response.

9. The information coordination program according to claim 7, wherein
the numerical control data is transmitted to the numerical-control-data storage device based on information-coordination timing setting information that defines a time when the information coordination command is to be transmitted at the information-coordination-command transmission procedure.

10. The information coordination program according to claim 7, further causing the numerical control device to execute a numerical-control-data edition procedure editing the numerical control data collected at the numerical-control-data collection procedure according to a predetermined condition after the numerical-control-data collection procedure and before the information-coordination-command generation procedure, wherein the edited numerical control data is transmitted at the information-coordination-command transmission procedure.

11. The information coordination program according to claim 8, further causing the numerical control device to execute an updating-numerical-control-data edition procedure editing the updating numerical control data included in the response received at the information-coordination-command reception procedure according to a predetermined condition after the information-coordination-command reception procedure and before the numerical-control-data updating procedure, wherein the numerical control data stored in the data memory is updated with the edited updating numerical control data at the numerical-control-data updating procedure.

* * * * *